United States Patent
Ahn et al.

(10) Patent No.: US 7,535,514 B2
(45) Date of Patent: May 19, 2009

(54) APPARATUS AND METHOD FOR DECODING SECAM CHROMINANCE SIGNAL

(75) Inventors: Deuk-Geun Ahn, Seoul (KR);
Bong-Soon Kang, Busan (KR);
Joo-Young Ha, Gyeongsangnam-do (KR); Ju-Hyun Kim, Busan (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 675 days.

(21) Appl. No.: 11/259,758

(22) Filed: Oct. 25, 2005

(65) Prior Publication Data

US 2006/0109379 A1    May 25, 2006

(30) Foreign Application Priority Data

Oct. 25, 2004    (KR) ..................... 10-2004-0085214

(51) Int. Cl.
*H04N 9/66* (2006.01)
*H04N 9/77* (2006.01)

(52) U.S. Cl. ...................... 348/638; 348/713

(58) Field of Classification Search ................. 348/708, 348/712, 713, 638–641, 663, 727, 504, 507; H04N 9/64, H04N 9/77, 9/78, 9/66, 5/455

See application file for complete search history.

(56) References Cited

U.S. PATENT DOCUMENTS

| 6,377,313 | B1 * | 4/2002 | Yang et al. ................... 348/712 |
| 7,227,585 | B1 * | 6/2007 | Murdock et al. ............ 348/641 |
| 2003/0043301 | A1 | 3/2003 | Renner et al. |

FOREIGN PATENT DOCUMENTS

| EP | 0939555 A1 | 9/1999 |
| JP | 10-093987 | 4/1998 |
| KR | 1998-21747 | 6/1998 |

OTHER PUBLICATIONS

English language abstract of Korean Publication 1998-21747.
English language abstract of Japanese Publication No. 10-093987.

* cited by examiner

*Primary Examiner*—Sherrie Hsia
(74) *Attorney, Agent, or Firm*—Marger Johnson & McCollom, P.C.

(57) ABSTRACT

We describe an apparatus and method for decoding a SECAM chrominance signal. The apparatus may include a band-pass filter to separate the chrominance signal from the composite video baseband signal. A down-mixer down mixes the chrominance signal from a high to a low frequency band to generate two signals having a substantially 90° phase difference. A cloche filter filters the two signals. A differentiator differentiates the cloche filtered signals. A multiplier squares each differentiated signal. An adder sums the squared result while a square root takes the square root of the sum.

20 Claims, 7 Drawing Sheets

APPARATUS AND METHOD FOR DECODING SECAM CHROMINANCE SIGNAL

RELATED APPLICATIONS

This application claims priority from Korean Patent Application No. 2004-85214 filed on Oct. 25, 2004, the contents of which we incorporate by reference.

BACKGROUND

1. Field

We describe an apparatus and a method of decoding a SECAM composite video baseband signal and, more particularly, to an apparatus and method of recovering a chrominance signal from a SECAM composite video baseband signal.

2. Related Art

A video signal may be compliant with various broadcast standards corresponding to various industry groups, including the National Television System Committee (NTSC), Phase Alternating Line (PAL), and Séquentiel Couleur Avec Mémoire (SECAM).

The SECAM standard is the composite video signal standard that was developed in France in 1953. SECAM is an analog color broadcast television system primarily used in France, Russia, and Eastern Europe.

The SECAM standard has 625 scan lines per frame in a 6-MHz bandwidth, 25 frames per second, and 50 fields per second in a 2:1 interlaced system. The definitions of luminance and chrominance are the same with the PAL standard, except for bandwidth.

While the NTSC and the PAL standards transmit the chrominance signal in a Quadrature Amplitude Modulation (QAM) scheme, the SECAM standard transmits the chrominance signal in a Frequency Modulation (FM) scheme. In addition, the SECAM standard separately transmits an R-Y color difference signal and a B-Y color difference signal through alternate scan lines. That is, in one scan line, the R-Y color difference signal is transmitted, while the B-Y color difference signal is ignored. In a next scan line, the B-Y color difference signal is transmitted, while the R-Y color difference signal is ignored. Accordingly, the vertical color resolution decreases by half. Compared with the NTSC and the PAL standards, the SECAM standard prevents chrominance signal interference, resulting in more stable color reproduction.

FIG. 1 is a frequency spectrum of a SECAM composite video baseband signal.

Referring to FIG. 1, a luminance signal (Y) occupies an entire video bandwidth. In contrast, an R-Y color difference signal (referred to as a DR chrominance signal) and a B-Y color difference signal (referred to as a DB chrominance signal) are FM modulated on their inherent sub-carrier frequencies.

The $D_R$ chrominance signal has a sub-carrier frequency ($F_{OR}$) of about 4.40625 of MHz and the $D_B$ chrominance signal sub-carrier frequency ($F_{OB}$) has about 4.25 of MHz.

In FIG. 1, the DR chrominance signal and the $D_B$ chrominance signal are alternately transmitted through the scan lines. For example, the $D_R$ chrominance signal is transmitted through the odd lines of a field and the $D_B$ chrominance signal is transmitted through the even lines of the same field.

As described above, like the NTSC and the PAL standards, the SECAM standard transmits the chrominance signal and the luminance signal over one channel.

The luminance signal alone exists in a relatively low frequency band, the luminance signal and the chrominance signal coexist in a medium frequency band, and again the luminance signal alone exists in a relatively high frequency band.

In the transmission scheme, no reference signal is used to discriminate between luminance and chrominance signals. The luminance signal and chrominance signals may mix to produce chrominance noise. More particularly, the luminance signals existing in a region in which the chrominance signal exists or in close proximity to the region may be mixed with the chrominance signals to produce chrominance noise.

The FM chrominance signal represents colors at various frequencies. To decode the FM chrominance signal into the original chrominance signal, a phase change must be detected in real time and a signal must be determined depending on the phase change.

Accordingly a need remains for an improved apparatus and method for decoding SECAM chrominance signals.

SUMMARY

We describe an apparatus and method for decoding a SECAM chrominance signal that address disadvantages associated with prior such apparatus and methods.

We describe an apparatus and method for decoding a SECAM chrominance signal that reduces chrominance noise and may be implemented using simple and inexpensive hardware.

And we describe a SECAM video decoder having an apparatus and/or utilizing a method for decoding a SECAM chrominance signal that reduces chrominance noise and may be implemented using simple and inexpensive hardware.

We provide a method for decoding a SECAM composite video baseband signal including band-pass filtering the SECAM composite video baseband signal to separate a chrominance signal component and down-mixing the chrominance signal component from a high frequency band into a low frequency band to generate at least two down-mixed signals having a substantially 90° phase difference relative to each other. The method further includes cloche-filtering the at least two down-mixed signals to generate at least two cloche-filtered signals and differentiating each of the at least two cloche-filtered signals to generate at least two differentiated signals. And the method includes squaring each of the at least two differentiated signals to generate at least two squared signals, summing the at least two squared signals to generate a summed signal, and taking a square-root of the summed signal to generate a decoded signal.

We provide an apparatus including a chrominance signal separating filter to separate a chrominance signal component from a SECAM composite video baseband signal and a down-mixing unit to generate at least two down-mixed signals having a substantially 90° phase difference between them by down-mixing the chrominance signal component from a high frequency band into a frequency band. A cloche filtering unit generates at least two cloche-filtered signals by cloche-filtering the at least two down-mixed signals. A chrominance signal recovering unit recovers an original chrominance signal by manipulating the at least two cloche-filtered signals. A sign recovering unit determines a sign of the original chrominance signal.

We provide a SECAM video decoder including a chrominance signal processing unit to recover a chrominance signal component in a SECAM composite video baseband signal, a luminance signal processing unit to recover a luminance signal component in the SECAM composite video baseband signal, and a timing controlling unit to control the chrominance signal processing unit and the luminance signal processing unit responsive to synchronization signals. The chrominance signal processing unit includes a chrominance signal separating filter to separate a chrominance signal component from a SECAM composite video baseband signal, a down-mixing unit to generate at least two down-mixed signals having a substantially 90° phase difference between them by down-mixing the chrominance signal component from a high frequency band into a frequency band. The chrominance signal processing unit further includes a cloche filtering unit to generate at least two cloche-filtered signals by cloche-filtering the at least two down-mixed signals, a chrominance signal recovering unit to recover an original chrominance signal by manipulating the at least two cloche-filtered signals, and a sign recovering unit to determine a sign of the original chrominance signal.

BRIEF DRAWINGS DESCRIPTION

The above and other advantages of the present will become more apparent by describing the example embodiments with reference to the accompanying drawings.

DETAILED DESCRIPTION

Figure 1:
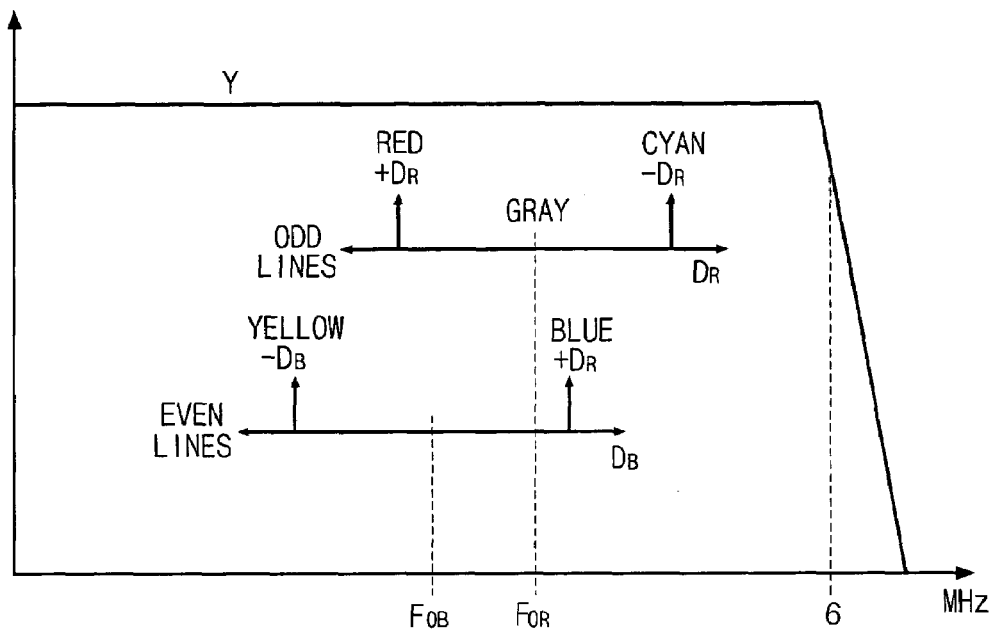
FIG. 1 is a frequency spectrum of a SECAM composite video baseband signal.

It will be understood that, although the terms first, second, and so on, may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, and so on).

The terminology used here is for the purpose of describing particular embodiments only and is not intended to be limiting of the invention. The singular forms a, an, and the are intended to include the plural forms as well, unless the context clearly indicates otherwise. It will be further understood that the terms comprises, comprising, includes and/or including, specify the presence of stated features, integers, steps, operations, elements, and/or components, but do not preclude the presence or addition of one or more other features, integers, steps, operations, elements, components, and/or groups.

Unless otherwise defined, all terms (including technical and scientific terms) used herein have the same meaning as commonly understood by one of ordinary skill in the art to which this apparatus and method belong. It will be further understood that terms, such as those defined in commonly used dictionaries, should be interpreted as having a meaning that is consistent with their meaning in the context of the relevant art and will not be interpreted in an idealized or overly formal sense unless expressly so defined.

A SECAM chrominance signal is a frequency-modulated signal having various frequencies depending on the original chrominance signal. Accordingly, parameters of the original chrominance signal, that is contained in the various frequencies of the frequency-modulated signal, need to be obtained to decode the SECAM chrominance signal. An analysis of the input signal, therefore, is required.

A SECAM composite video baseband signal (CVBS) includes a luminance signal and a chrominance signal. The luminance signal and the chrominance signal may be expressed as is shown in Equation 1.

$$\text{Luminance, } Y = Y_1 + Y_2 \cdot \sin(2\pi \cdot f_x \cdot t)$$

$$\text{Chrominance, } C(Dr) \text{ or } C(Db) = G \cdot \sin 2\pi \{f_{OR} \cdot t + \Delta f_{OR} \int_0 D_R(\tau) d\tau\} \text{ or } G \cdot \sin 2\pi \{f_{OB} \cdot t + \Delta f_{OB} \int_0 D_B(\tau) d\tau\}$$

Equation 1 where $f_x$: Frequency component in the luminance signal
$Y_1$: DC value of the luminance signal
$Y_2$: Amplitude of the sinusoidal wave
$f_{OR}$: Sub-carrier frequency of the $D_R$ chrominance signal
$f_{OB}$: Sub-carrier frequency of the $D_B$ chrominance signal
$D_R(T)$: Original $D_R$ chrominance signal
$D_B(T)$: Original $D_B$ chrominance signal
$\Delta f_{OR}$: Frequency deviation of the $D_R$ chrominance signal
$\Delta f_{OB}$: Frequency deviation of the $D_B$ chrominance signal
G: 23IRE/2

Institute of Radio Engineers (IRE) is the predecessor organization to the Institute of Electrical and Electronic Engineers (IEEE). The unit IRE is named after the organization of the same name and represents a unit of amplitude of a video signal. 100 IRE represents a signal of 714 mV.

As described above, the SECAM standard alternately transmits a $D_R$ chrominance signal and a $D_B$ chrominance signal. Accordingly, the luminance signal (Y) and the chrominance signal (Dr) of Equation 1 are combined to produce the $D_R$ line's composite video signal. Similarly, the luminance signal (Y) and the chrominance signal (Db) are combined to produce the $D_B$ line's composite video signal. The composite video signals for the $D_R$ and $D_B$ lines may be expressed as is shown in Equations 2 and 3 below, respectively. Namely, Equation 2 represents the DR line's composite video signal and Equation 3 represents the $D_B$ line's composite video signal.

$$Y + C(Dr) = Y_1 + Y_2 \cdot \sin(2\pi \cdot f_x \cdot t) +$$
$$G \cdot \sin 2\pi \left\{ f_{OR} \cdot t + \Delta f_{OR} \int_0^t D_R(\tau) d\tau \right\} =$$
$$Y_1 + Y_2 \cdot \sin(2\pi \cdot f_x \cdot t) +$$
$$G \sin 2\pi \left\{ f_0 t + (f_{OR} t - f_0 t) + \Delta f_{OR} \int_0^t D_R(\tau) d\tau \right\} =$$
$$Y_1 + Y_2 \cdot \sin(2\pi \cdot f_x \cdot t) +$$
$$G \left[ \cos 2\pi f_0 t \cdot \sin 2\pi \left\{ (f_{OR} - f_0) t + \Delta f_{OR} \int_0^t D_R(\tau) d\tau \right\} + \sin 2\pi f_0 t \cdot \cos 2\pi \left\{ (f_{OR} - f_0) t + \Delta f_{OR} \int_0^t D_R(\tau) d\tau \right\} \right]$$

Equation 2

$$Y + C(Db) = Y_1 + Y_2 \cdot \sin(2\pi \cdot f_x \cdot t) +$$
$$G \cdot \sin 2\pi \left\{ f_{OB} \cdot t + \Delta f_{OB} \int_0^t D_B(\tau) d\tau \right\} =$$
$$Y_1 + Y_2 \cdot \sin(2\pi \cdot f_x \cdot t) +$$
$$G \sin 2\pi \left\{ f_0 t + (f_{OB} t - f_0 t) + \Delta f_{OB} \int_0^t D_B(\tau) d\tau \right\} =$$
$$Y_1 + Y_2 \cdot \sin(2\pi \cdot f_x \cdot t) +$$
$$G \left[ \cos 2\pi f_0 t \cdot \sin 2\pi \left\{ (f_{OB} - f_0) t + \Delta f_{OB} \int_0^t D_B(\tau) d\tau \right\} + \sin 2\pi f_0 t \cdot \cos 2\pi \left\{ (f_{OB} - f_0) t + \Delta f_{OB} \int_0^t D_B(\tau) d\tau \right\} \right]$$

Equation 3

A signal modulated in a SECAM encoder typically has a carrier frequency $f_0$ of 4.286 MHz. In order to extract the original chrominance signals $D_R(T)$ and $D_B(T)$ from the composite video signals expressed in Equations 2 and 3, a down-mixing operation needs to be performed to change a high frequency band signal into a low frequency band signal.

First, the carrier frequency ($f_0$) component may be removed from the composite video signals of Equation 2 and 3 by multiplying those signals by signals having a frequency and phase equal to those of the carrier, e.g., $\cos 2\pi f_0 t$ and $\sin 2\pi f_0 t$.

The following equations 4a and 4b represent the results obtained by multiplying the composite video signal of the $D_R$ line expressed as Equation 2 by the signal $\cos 2\pi f_0 t$ and $\sin 2\pi f_0 t$ having the frequency and phase equal to those of the carrier.

$$Eq.(2) \times \cos 2\pi f_0 t =$$
$$Y_1 \cdot \cos 2\pi f_0 t + Y_2 \cdot \sin(2\pi \cdot f_x \cdot t) \cdot \sin(2\pi \cdot f_x \cdot t) \cdot \cos 2\pi f_0 t +$$
$$\frac{1}{2} G \left[ \sin 2\pi \left\{ (f_{OR} - f_0) t + \Delta f_{OR} \int_0^t D_R(\tau) d\tau \right\} + \sin 2\pi \left\{ 2 f_0 t + (f_{OR} - f_0) t + \Delta f_{OR} \int_0^t D_R(\tau) d\tau \right\} \right] =$$
$$Y_1 \cdot \cos 2\pi f_0 t + \frac{1}{2} Y_2 \cdot \{ \sin(2\pi (f_x - f_0) t) + \sin(2\pi (f_x + f_0) t) \} +$$
$$\frac{1}{2} G \left[ \sin 2\pi \left\{ (f_{OR} - f_0) t + \Delta f_{OR} \int_0^t D_R(\tau) d\tau \right\} + \sin 2\pi \left\{ 2 f_0 t + (f_{OR} - f_0) t + \Delta f_{OR} \int_0^t D_R(\tau) d\tau \right\} \right]$$

Equation 4a $$Equation 2 \times \sin 2\pi f_0 t =$$
$$Y_1 \cdot \sin 2\pi f_0 t + Y_2 \cdot \sin(2\pi \cdot f_x \cdot t) \cdot \sin(2\pi \cdot f_x \cdot t) \cdot \sin 2\pi f_0 t +$$
$$\frac{1}{2} G \left[ \cos 2\pi \left\{ (f_{OR} - f_0) t + \Delta f_{OR} \int_0^t D_R(\tau) d\tau \right\} - \cos 2\pi \left\{ 2 f_0 t + (f_{OR} - f_0) t + \Delta f_{OR} \int_0^t D_R(\tau) d\tau \right\} \right] =$$
$$Y_1 \cdot \sin 2\pi f_0 t + \frac{1}{2} Y_2 \cdot \{ \cos(2\pi (f_x - f_0) t) - \cos(2\pi (f_x + f_0) t) \} +$$
$$\frac{1}{2} G \left[ \cos 2\pi \left\{ (f_{OR} - f_0) t + \Delta f_{OR} \int_0^t D_R(\tau) d\tau \right\} - \cos 2\pi \left\{ 2 f_0 t + (f_{OR} - f_0) t + \Delta f_{OR} \int_0^t D_R(\tau) d\tau \right\} \right]$$

Equation 4b

Similarly, Equations 5a and 5b represent the results obtained by multiplying the $D_B$ line's composite video signal expressed in Equation 3 by the signal $\cos 2\pi f_0 t$ and $\sin 2\pi f_0 t$ having the frequency and phase equal to those of the carrier.

$$Equation 3 \times \cos 2\pi f_0 t =$$
$$Y_1 \cdot \cos 2\pi f_0 t + Y_2 \cdot \sin(2\pi \cdot f_x \cdot t) \cdot \cos 2\pi f_0 t +$$
$$\frac{1}{2} G \left[ \sin 2\pi \left\{ (f_{OB} - f_0) t + \Delta f_{OB} \int_0^t D_B(\tau) d\tau \right\} + \sin 2\pi \left\{ 2 f_0 t + (f_{OB} - f_0) t + \Delta f_{OB} \int_0^t D_B(\tau) d\tau \right\} \right] =$$
$$Y_1 \cdot \cos 2\pi f_0 t + \frac{1}{2} Y_2 \cdot \{ \sin(2\pi (f_x - f_0) t) + \sin(2\pi (f_x + f_0) t) \} +$$
$$\frac{1}{2} G \left[ \sin 2\pi \left\{ (f_{OB} - f_0) t + \Delta f_{OB} \int_0^t D_B(\tau) d\tau \right\} + \sin 2\pi \left\{ 2 f_0 t + (f_{OB} - f_0) t + \Delta f_{OB} \int_0^t D_B(\tau) d\tau \right\} \right]$$

Equation 5a $$Equation 3 \times \sin 2\pi f_0 t =$$
$$Y_1 \cdot \sin 2\pi f_0 t + Y_2 \cdot \sin(2\pi \cdot f_x \cdot t) \cdot \sin(2\pi \cdot f_x \cdot t) \cdot \sin 2\pi f_0 t +$$
$$\frac{1}{2} G \left[ \cos 2\pi \left\{ (f_{OB} - f_0) t + \Delta f_{OB} \int_0^t D_B(\tau) d\tau \right\} - \cos 2\pi \left\{ 2 f_0 t + (f_{OB} - f_0) t + \Delta f_{OB} \int_0^t D_B(\tau) d\tau \right\} \right] =$$
$$Y_1 \cdot \sin 2\pi f_0 t + \frac{1}{2} Y_2 \cdot \{ \cos(2\pi (f_x - f_0) t) - \cos(2\pi (f_x + f_0) t) \} +$$
$$\frac{1}{2} G \left[ \cos 2\pi \left\{ (f_{OB} - f_0) t + \Delta f_{OB} \int_0^t D_B(\tau) d\tau \right\} - \cos 2\pi \left\{ 2 f_0 t + (f_{OR} - f_0) t + \Delta f_{OB} \int_0^t D_B(\tau) d\tau \right\} \right]$$

Equation 5b

The high frequency components are removed from the signals represented by equations 4a, 4b, 5a, and 5b by a low pass filter.

Figure 2:
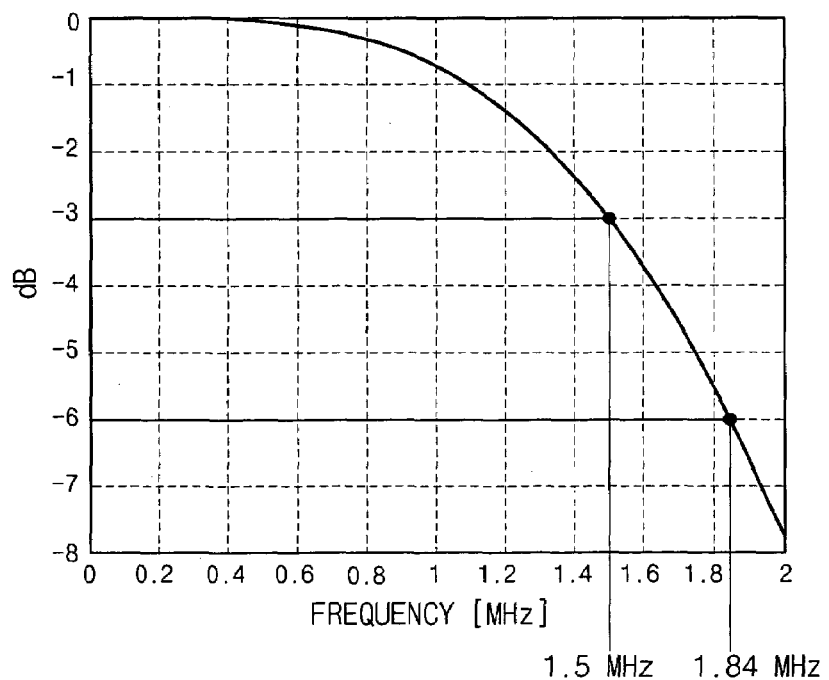
FIG. 2 is a frequency response curve of a low pass filter used for recovering a chrominance signal according to an example embodiment.

FIG. 2 is a frequency response curve of a low pass filter used for recovering the chrominance signal according to an example embodiment of the present invention.

Referring to FIG. 2, a 3 dB bandwidth of the low pass filter is about 1.5 MHz, and a frequency corresponding to −6 dB at which 50% of power is passed is about 1.84 MHz. Accordingly, the relatively high frequency components of the signals, represented by Equations 4a, 4b, 5a, and 5b, are removed by the low pass filter of FIG. 2. Consequently, signals with a low frequency band remain as shown in Equations 6a and 6b and Equations 7a and 7b below:

$$\frac{1}{2}Y_2\sin(2\pi(f_x - f_0)t) + \qquad\qquad\text{Equation 6a}$$

$$\frac{1}{2}G\sin2\pi\left\{(f_{OR} - f_0)t + \Delta f_{OR}\int_0^t D_R(\tau)d\tau\right\}$$

$$\frac{1}{2}Y_2\cos(2\pi(f_x - f_0)t) + \qquad\qquad\text{Equation 6b}$$

$$\frac{1}{2}G\cos2\pi\left\{(f_{OR} - f_0)t + \Delta f_{OR}\int_0^t D_R(\tau)d\tau\right\}$$

$$\frac{1}{2}Y_2\sin(2\pi(f_x - f_0)t) + \qquad\qquad\text{Equation 7a}$$

$$\frac{1}{2}G\sin2\pi\left\{(f_{OB} - f_0)t + \Delta f_{OB}\int_0^t D_B(\tau)d\tau\right\}$$

$$\frac{1}{2}Y_2\cos(2\pi(f_x - f_0)t) + \qquad\qquad\text{Equation 7b}$$

$$\frac{1}{2}G\cos2\pi\left\{(f_{OB} - f_0)t + \Delta f_{OB}\int_0^t D_B(\tau)d\tau\right\}$$

The low pass filter in FIG. 2 shifts the carrier frequency ($f_0$) components of the signals represented by Equations 6a, 6b, 7a, and 7b from a high frequency band to a low frequency band.

Thus, the $D_R$ line's composite video signal, which is multiplied by the signal having the same frequency and phase of the carrier and passed through the low pass filter, is down-mixed into two signals with a 90° phase difference as shown in Equations 6a and 6b. Likewise, the $D_B$ line's composite video signal is down-mixed into two signals with a 90° phase difference as shown in Equations 7a and 7b.

The frequency difference ($f_x$–$f_0$) is a problematic chrominance noise component in Equations 6a and 6b and Equations 7a and 7b. The chrominance noise frequency difference ($f_x$–$f_0$) is generated by the luminance signal, and is not eliminated by the low pass filter.

In the SECAM standard, not all of the luminance signals exist in the low frequency region, as already described with reference in FIG. 1. Therefore, the luminance signals existing in the frequency region of the chrominance signals or in close proximity to that region, may be mixed with the chrominance signals generating chrominance noise.

And because the original chrominance signals $D_R(T)$ and $D_B(T)$ still remain as phase components of the sinusoidal waves, it is difficult to recover the original chrominance signals $D_R(T)$ and $D_B(T)$ from Equations 6a, 6b, 7a, and 7b.

To reduce the chrominance noise, the SECAM composite video signals expressed in Equations 2 and 3 may be passed through a band-pass filter (BPF) to suppress the luminance signal components. Because the original chrominance signals still remain as the frequency components in the filtered signals after reducing the chrominance noise, a differentiator, a squarer, and a square rooter may be used to convert the frequency components into the amplitude components. And because the output of the square rooter is always positive, the sign of the recovered chrominance signal is obtained using the differential characteristic of a trigonometric function.

Figure 3:
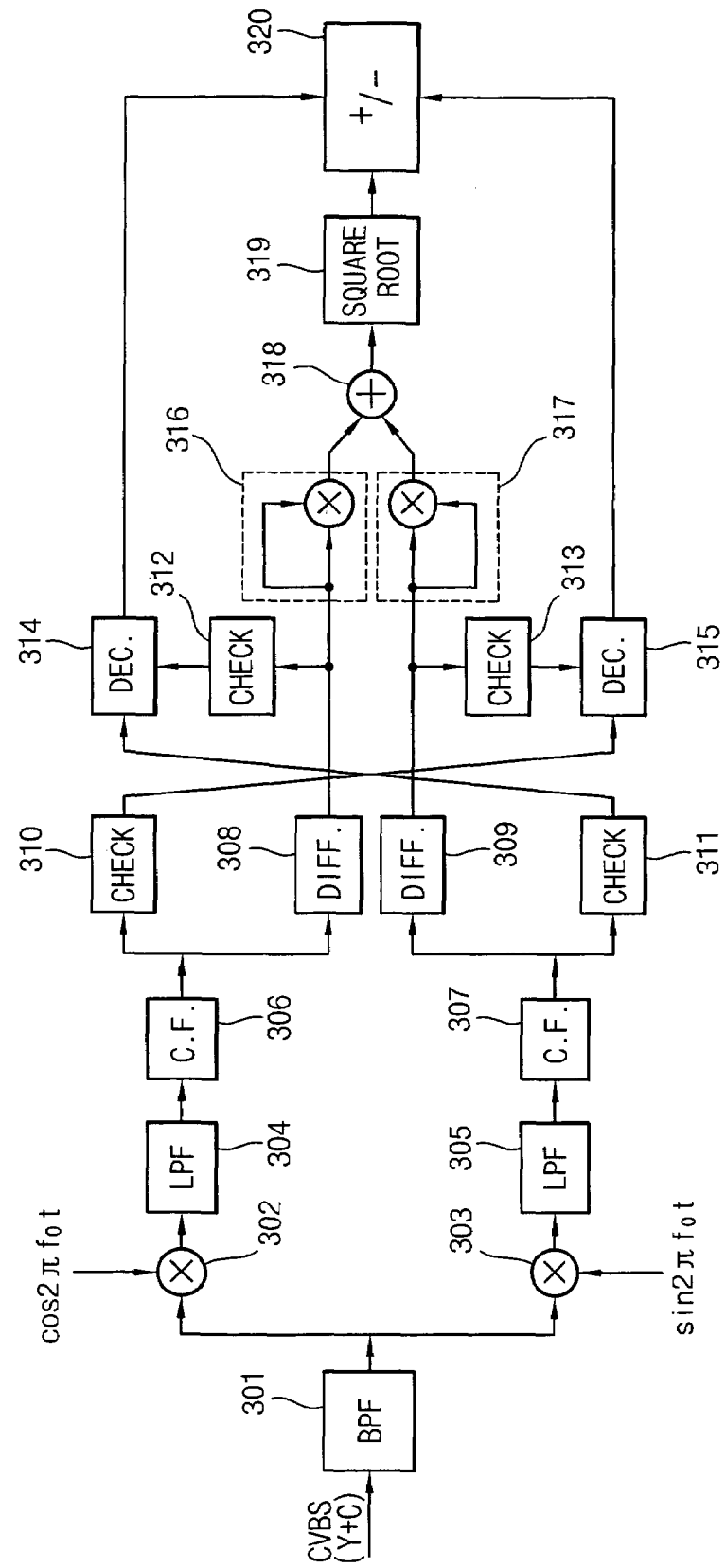
FIG. 3 is a block diagram of an apparatus for recovering a chrominance signal according to an example embodiment.

FIG. 3 is a block diagram of an apparatus for recovering a chrominance signal according to an example embodiment. FIG. 3 also shows the signal flow associated with the apparatus. Referring to FIG. 3, the BPF filter 301 may have the chrominance signal frequency band of FIG. 1 as its pass band. The BPF 301 filters the chrominance signal from the SECAM composite video baseband signal CVBS it receives at its input.

As described above, the SECAM composite video baseband signal CVBS may be the $D_R$ line's composite video baseband signal Equation 2, in which the luminance signal and the $D_R$ chrominance signal are mixed. Or the SECAM composite video baseband signal CVBS may be the $D_B$ line's composite video baseband signal of Equation 3, in which the luminance signal and the $D_B$ chrominance signal are mixed. This is because the chrominance signals are alternately inputted to the $D_R$ line and the $D_B$ line according to the characteristics of the SECAM standard.

Figure 4:
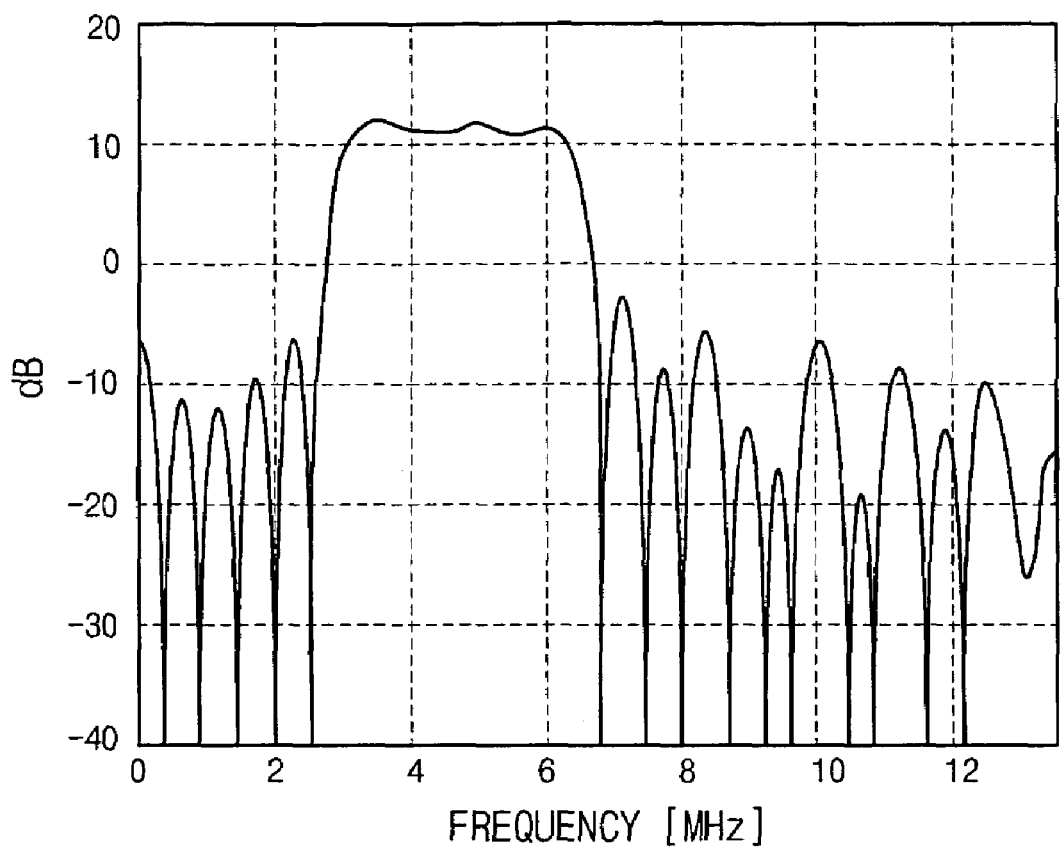
FIG. 4 is a frequency response curve of a chrominance signal separating filter according to an example embodiment.

FIG. 4 is a frequency response curve of the chrominance signal separating BPF filter 301 according to an example embodiment. Referring to FIG. 4, the band-pass filter 301 has a pass band frequency similar to the chrominance signal band.

To separate the chrominance signal from the luminance signal, the pass band of the BPF filter 301 considers their associated bandwidth.

The chrominance noise expressed in Equations 6a, 6b, 7a, and 7b may be removed by suppressing the luminance signal in the $D_R$ or $D_B$ line's composite video baseband signal using the BPF filter 301. Because the chrominance noise is caused by mixing the luminance with the chrominance signal, the chrominance noise may be advantageously reduced by separating these two signals in an initial stage.

As described above, the chrominance signal passing through the BPF filter 301 is respectively multiplied by the signal (e.g., cos $2\pi f_0 t$ and sin $2\pi f_0 t$) having the frequency and phase equal to those of the carrier. The BPF filter 301 removes carrier frequency ($f_0$) component. The chrominance signal may, therefore, shift from the high frequency band to the low frequency band.

Referring again to FIG. 3, a multiplier 302 multiplies the output of the BPF filter 301 by cos $2\pi f_0 t$. And multiplier 303 multiplies the output of the BPF by sin $2\pi f_0 t$. Accordingly, the multipliers 302 and 303 output the signals expressed in Equations 4a and 4b, respectively, when the $D_R$ line's chrominance signal is received by the BPF filter 301. Similarly, the multipliers 302 and 303 output the signals expressed by Equations 5a and 5b, respectively, when the $D_B$ line's chrominance is received by the BPF filter 301.

The signals output from the multipliers 302 and 303 are passed through low pass filters (LPFs) 304 and 305, respectively. Without advance removal of the luminance signals by the BPF filter 301, the LPFs 304 and 305 would output the signals expressed by the Equations 6a and 6b or 7a and 7b, respectively.

Since the BPF 301 removes in advance the luminance signals, however, the LPFs 304 and 305 instead output the signals expressed by Equations 8a and 8b or Equations 9a and 9b, respectively.

$$\frac{1}{2}G\sin2\pi\left\{(f_{OR} - f_0)t + \Delta f_{OR}\int_0^t D_R(\tau)d\tau\right\} \qquad\text{Equation 8a}$$

$$\frac{1}{2}G\cos2\pi\left\{(f_{OR} - f_0)t + \Delta f_{OR}\int_0^t D_R(\tau)d\tau\right\} \qquad\text{Equation 8b}$$

$$\frac{1}{2}G\sin2\pi\left\{(f_{OB} - f_0)t + \Delta f_{OB}\int_0^t D_B(\tau)d\tau\right\} \qquad\text{Equation 9a}$$

$$\frac{1}{2}G\cos2\pi\left\{(f_{OB} - f_0)t + \Delta f_{OB}\int_0^t D_B(\tau)d\tau\right\} \qquad\text{Equation 9b}$$

Next, chrominance low pass filters 304 and 305 provide their output to cloche filters 306 and 307, respectively.

The cloche filters 306 and 307 decode signals that are converted through an anti-cloche filter in a SECAM encoder side so as to improve signal-to-noise ratio (SNR).

Even though the chrominance noise from the signals expressed as Equations 6a and 6b or Equations 7a and 7b are removed using the BPF filter 301, the chrominance signal still remains as the phase of the sinusoidal wave. The chrominance signals of Equations 8a and 8b or Equations 9a and 9b, therefore, need to be converted from the phase component of the sinusoidal wave to the amplitude component. For this purpose, the signals expressed by Equations 8a and 8b or Equations 9a and 9b may be respectively differentiated by differentiators 308 and 311, respectively. When the signals of Equations 8a and 8b or Equations 9a and 9b are differentiated by differentiators 308 and 311 with respect to time axis (t), the results will be signals expressed by Equations 11a and 11b or Equations 12a and 12b, respectively. Equation 10 explains the differential characteristic of the combined function so as to differentiate Equations 8a and 8b or Equations 9a and 9b.

Referring to FIG. 3, differentiators 308 and 309 differentiate the signals expressed by Equations 8a and 8b or Equations 9a and 9b transmitted from the cloche filters 306 and 307 to output the signals of Equations 11a and 11b or Equations 12a and 12b, respectively. When the $D_R$ line's chrominance signal is processed, the differentiator 308 receives the signal of Equation 8a and outputs the signal of Equation 11a. And the differentiator 309 receives the signal of Equation 8b and outputs the signal of Equation 11b. Alternatively, when the $D_B$ line's chrominance signal is processed, the differentiator 308 receives the signal of Equation 9a and outputs the signal of Equation 12a, and the differentiator 309 receives the signal of Equation 9b and outputs the signal of Equation 12b.

$$\frac{dy}{dx} = \frac{dy}{du} \cdot \frac{du}{dx} = f'(u) \cdot g'(x) \qquad \text{Equation 10}$$

where y=f(u) and u=g(x) are differentiable functions and y=f(g(x)) can be differentiable by x.

$$\pi G\{(f_{OR}-f_0)+\Delta f_{OR}D_R(\tau)\} \times \cos 2\pi\{(f_{OR}-f_0)t+ \Delta f_{OR}\int_0 D_R(\tau)d\tau\} \qquad \text{Equation 11a}$$

$$-\pi G\{(f_{OR}-f_0)+\Delta f_{OR}D_R(\tau)\} \times \sin 2\pi\{(f_{OR}-f_0)t+ \Delta f_{OR}\int_0 D_R(\tau)d\tau\} \qquad \text{Equation 11b}$$

$$\pi G\{(f_{OB}-f_0)+\Delta f_{OB}D_B(\tau)\} \times \cos 2\pi\{(f_{OB}-f_0)t+ \Delta f_{OB}\int_0 D_B(\tau)d\tau\} \qquad \text{Equation 12a}$$

$$-\pi G\{(f_{OB}-f_0)+\Delta f_{OB}D_B(\tau)\} \times \sin 2\pi\{(f_{OB}-f_0)t+ \Delta f_{OB}\int_0 D_B(\tau)d\tau\} \qquad \text{Equation 12b}$$

The signals expressed as Equations 11a and 11b and Equations 12a and 12b have the same amplitude, frequency, and phase. Accordingly, if the results of Equations 11a and 11b are squared by squarers 316 and 317 and summed by adder 318, the result will be given by Equation 13 below. Similarly, if the results of Equations 12a and 12b are squared by squarers 316 and 317 and summed by adder 318, the result will be given by Equation 14 below.

The output of the adder 318 may be expressed as Equation 13 or 14 below. Namely, when the $D_R$ line's chrominance signal is received, the adder 318 outputs the signal expressed as Equation 13. When the $D_B$ line's chrominance signal is processed, on the other hand, the adder 318 outputs the signal expressed as Equation 14.

$$\pi^2 G^2\{(f_{OR}-f_0)+\Delta f_{OR}D_R(\tau)\}^2 \qquad \text{Equation 13}$$

$$\pi^2 G^2\{(f_{OB}-f_0)+\Delta f_{OB}D_B(\tau)\}^2 \qquad \text{Equation 14}$$

The output of the adder 318 is provided to square root 319. The square root 319 generates the signals expressed in Equations 15 and 16 by calculating the square root of the signals expressed in Equations 13 and 14, respectively. When the $D_R$ line is received, the square root 319 outputs the signal expressed in Equation 15. When the $D_B$ line is received, on the other hand, the square root 319 outputs the signal expressed as Equation 16.

$$\pi G\{(f_{OR}-f_0)+\Delta f_{OR}D_R(\tau)\} \qquad \text{Equation 15}$$

$$\pi G\{(f_{OB}-f_0)+\Delta f_{OB}D_B(\tau)\} \qquad \text{Equation 16}$$

$D_R(T)$ and $D_B(T)$ may be easily calculated because the coefficients of $D_R(T)$ and $D_B(T)$ and the remaining terms are all constants.

The results of Equations 15 and 16 are always expressed as positive numbers because they are calculated using square and square root operations that always produce such positive numbers. For this reason, the signal's original sign needs to be recovered. A method of recovering the sign of the signals of Equations 15 and 16 will now be described with reference to Equations 17, 18, and 19.

$$[\sin\{f(x)\}]' = f'(x) \cdot \cos\{f(x)\}$$

$$[\cos\{f(x)\}]' = -f'(x) \cdot \sin\{f(x)\} \qquad \text{Equation 17}$$

Equation 17 describes a differential characteristic of a trigonometric function. When Equation 17 is applied to Equations 8a and 8b and Equation 15, the result is given by Equation 18a or 18b.

$$Eq.(8a)' = \frac{2}{G} \times \{Eq.(15)\} \times \{Eq.(8b)\} \qquad \text{Equation 18a}$$

$$Eq.(8b)' = -\frac{2}{G} \times \{Eq.(15)\} \times \{Eq.(8a)\} \qquad \text{Equation 18b}$$

Similarly, when Equation 17 is applied to Equations 9a and 9b and Equation 16, the result will be given by Equation 19a or 19b.

$$Eq.(9a)' = \frac{2}{G} \times \{Eq.(16)\} \times \{Eq.(9b)\} \qquad \text{Equation 19a}$$

$$Eq.(9b)' = -\frac{2}{G} \times \{Eq.(16)\} \times \{Eq.(9a)\} \qquad \text{Equation 19b}$$

The sign of Equation 15 may be obtained from Equation 18a by using the sign of Equation 8b and the sign of Equation 8a. Alternatively, the sign of Equation 15 may be obtained from Equation 18b by using the sign of Equation 8a and the sign of Equation 8b.

The sign of Equation 16 may be obtained from Equation 19a by using the sign of Equations 9b and the sign of Equation 9a. Alternatively, the sign of Equation 16 may be obtained from Equation 19b by using the sign of Equation 9a and the sign of Equation 9b.

Referring to FIG. 3, a sign checker 310 checks the sign of the signal outputted from the cloche filter 306 and provides the checked sign to a sign determination block 315. A sign checker 313 checks the sign of the signal outputted from the differentiator 309 and provides the checked sign to the sign determination block 315. The sign determination block 315 determines the sign of the signal expressed by Equations 15 or 16, using Equation 19. Namely, when the $D_R$ chrominance signal is processed, the sign determination block 315 determines the sign of the signal expressed by Equation 15. When the $D_B$ chrominance signal is processed, on the other hand, the sign determination block 315 determines the sign of the signal expressed by Equation 16.

Similarly, a sign checker 311 checks the sign of the signal outputted from the cloche filter 307 and provides the checked sign to a sign determination block 314. A sign checker 312 checks the sign of the signal outputted from the differentiator 308 and provides the checked sign to the sign determination block 314. The sign determination block 314 determines the sign of the signal of Equation 15 or 16, using Equation 18. Namely, when the $D_R$ chrominance signal is processed, the sign determination block 314 determines the sign of the signal of Equation 15. When the $D_B$ chrominance signal is processed, on the other hand, the sign determination block 314 determines the sign of the signal of Equation 16.

Sign decision signals outputted from the sign determination blocks 314 and 315 are applied by block 320 to the output signal from the square rooter 319.

A person of reasonable skill in the art should recognize that a mathematical differential value may be different from a differential value determined by hardware. Compensating for this difference during sign determination may be additionally performed.

Figure 5A:
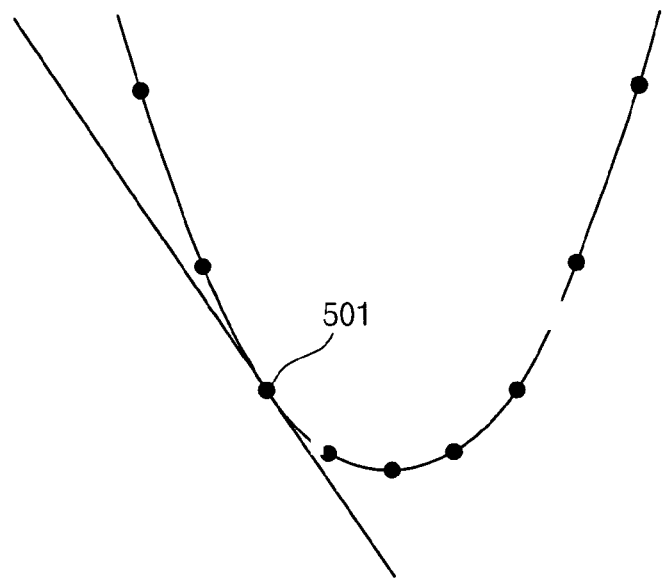
FIGS. 5A and 5B are graphs illustrating a difference between a mathematical differentiation and a hardware differentiation.
Figure 5B:
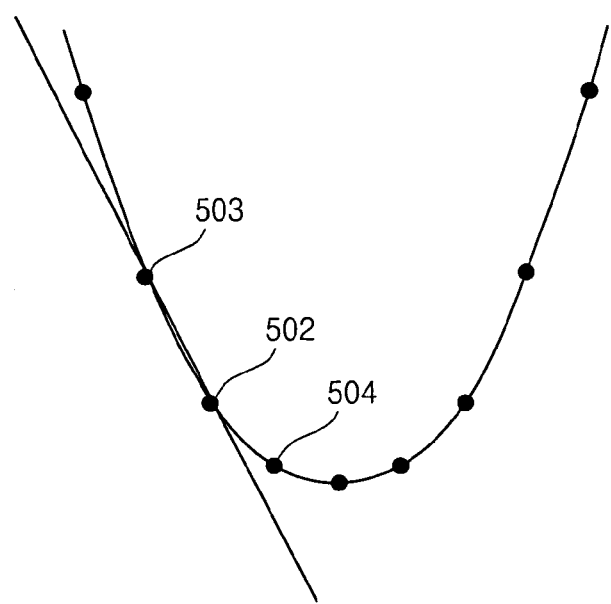

FIGS. 5A and 5B are graphs illustrating a difference between the mathematical differentiation and the hardware differentiation.

FIG. 5A illustrates a definition of mathematical differentiation. As illustrated in FIG. 5A, the mathematical differential value is defined by a slope of a tangential line at an arbitrary point 501.

FIG. 5B illustrates a method of a hardware differential value. As illustrated in FIG. 5B, the hardware differential value may be determined by a difference between a current value 502 and a value 503 of a prior sample. Alternatively, the hardware differential value may be determined by a difference between the current value 502 and a value 504 after one sample.

Accordingly, as described above, the sign determined by Equations 18a and 18b or Equations 19a and 19b may be different from a real sign when the differential values contained in Equations 18a and 18b or Equations 19a and 19b are calculated in a hardware manner. The discrepancy is addressed by determining the sign simultaneously through two paths. In processing the $D_R$ line's chrominance signal, the sign is decided simultaneously through Equations 18a and 18b. Similarly, in processing the $D_B$ line's chrominance signal, the sign is decided simultaneously through Equations 19a and 19b.

That is, the sign determination blocks 314 and 315 simultaneously determine the sign of the signal outputted from the square root 319. When the sign determined by the blocks 314 and 315 are substantially equal, that sign is provided as the sign of the signal outputted from the square root 319. When the sign determined by the sign block 314 is different from the sign determined by the sign block 315, the sign of a prior sample is used to reduce sign errors due to the hardware differentiation. According to the mathematical differentiation, the signs determined by Equations 18a and 18b or Equations 19a and 19b must always be substantially equal to each other. The signs determined by the two equations may not be substantially equal, however, due to hardware differentiation error.

Referring again to FIG. 3, the sign application block 320 receives the signs determined by the two sign determination blocks 314 and 315. When the two signs are substantially equal, the determined sign is applied to the output of the square root 319. When the two signs are unequal, the sign of a prior sample is used to reduce hardware differentiation error.

Figure 6A:
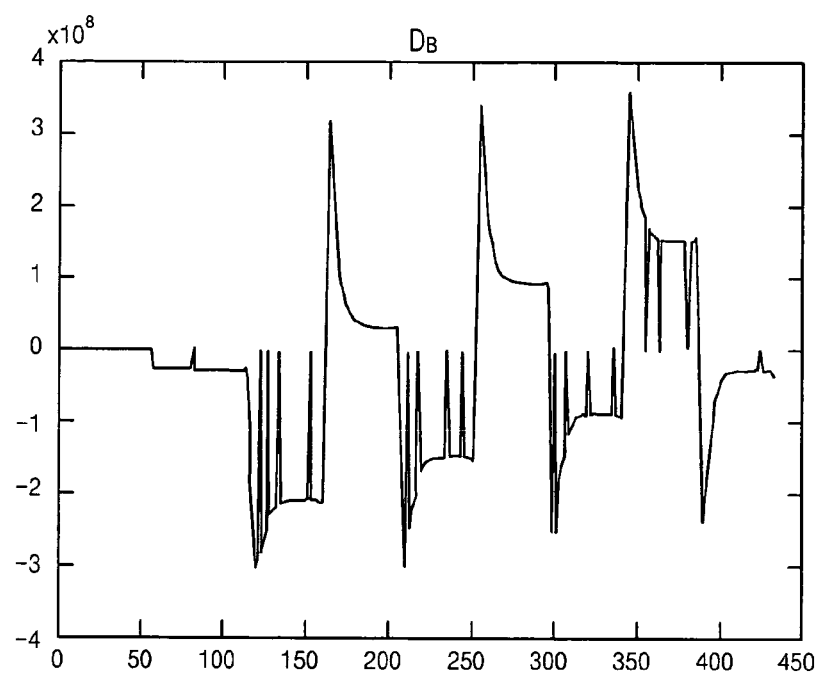
FIG. 6A is a waveform of a $D_B$ signal recovered from a color bar signal without using a sign compensating method.
Figure 6B:
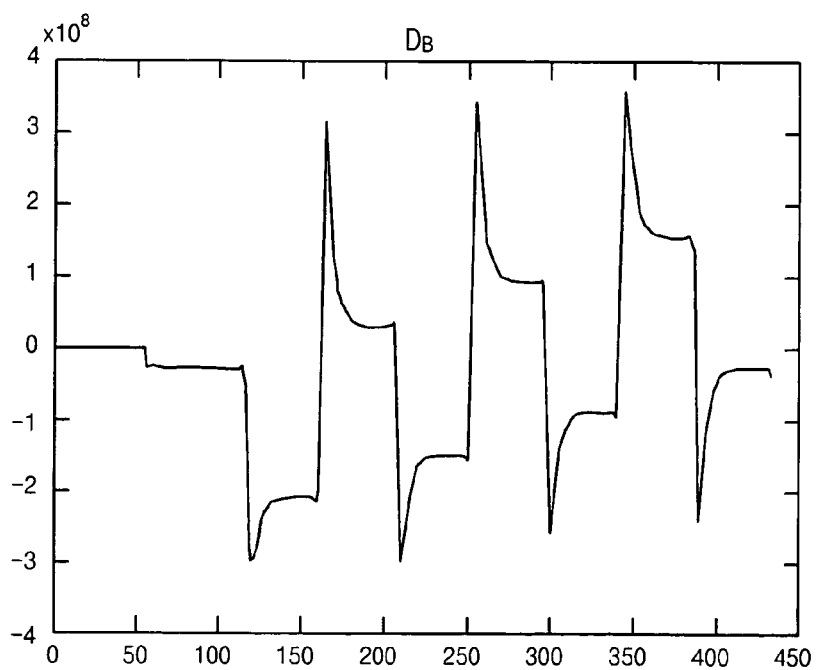
FIG. 6B is a waveform of a $D_B$ signal recovered from a color bar signal using a sign compensating method according to an example embodiment.

FIG. 6A is a waveform of the $D_B$ signal recovered from a color bar signal without using the sign compensating method. FIG. 6B is a waveform of the $D_B$ signal recovered from the color bar signal by using the sign compensating method according to an example embodiment.

Referring to FIG. 6A, when the hardware differentiation is applied, the sign of the recovered $D_B$ signal rapidly changes in terms of sample units due to hardware differentiation error.

Referring to FIG. 6B, when the sign compensation according to an example embodiment is applied, the waveform of the recovered $D_B$ signal is less noisy and its signal changes more precisely.

The deviation of the chrominance signal does not exceed 0.6 MHz in the actual SECAM signal, and thus the chrominance signal does not rapidly change in one sample. When the sign compensating method according to an example embodiment is applied, therefore, the recovered chrominance signal is more stable.

Figure 7:
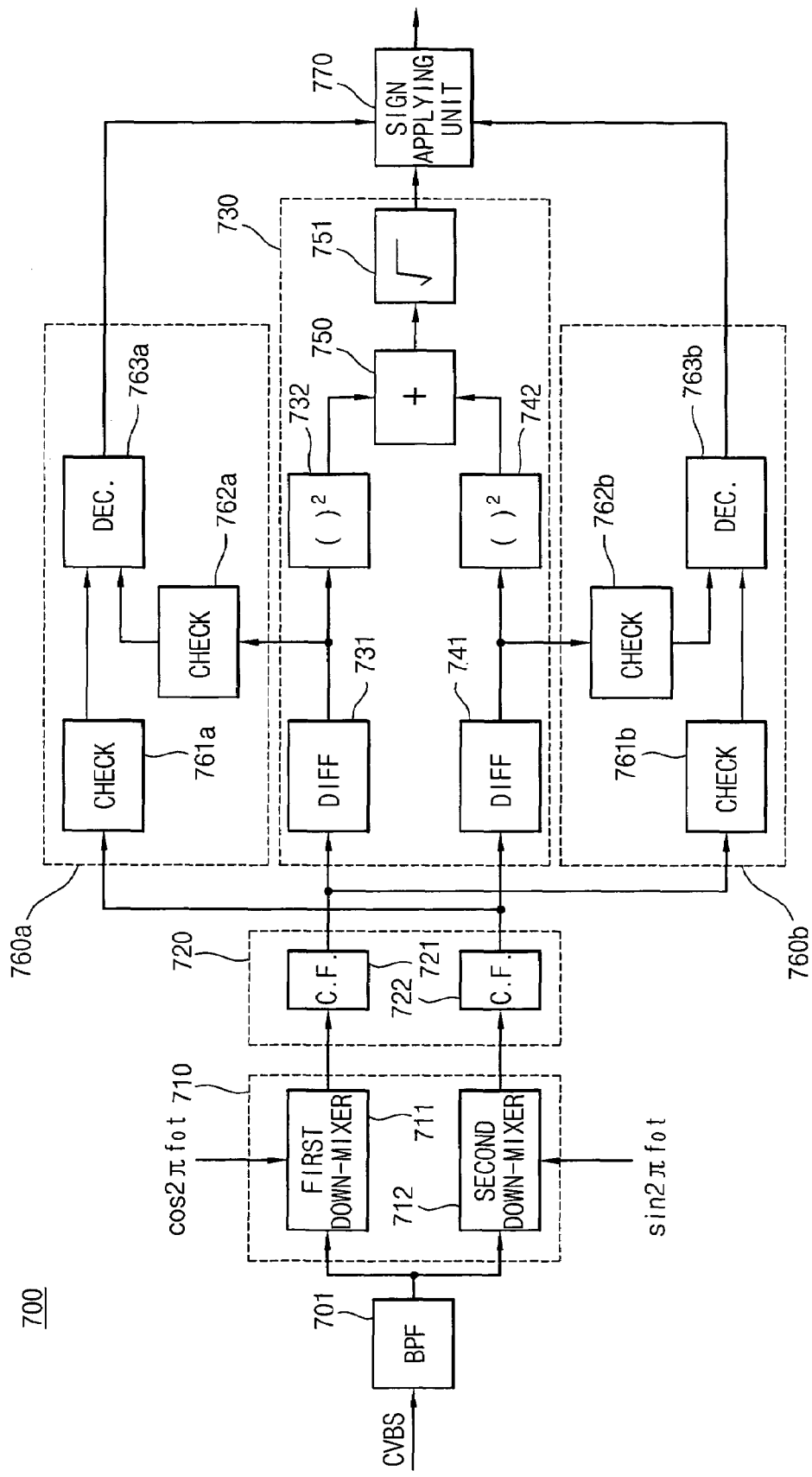
FIG. 7 is a block diagram of an apparatus for decoding a SECAM chrominance signal according to an example embodiment.

FIG. 7 is a block diagram of an apparatus 700 for decoding a SECAM chrominance signal using a method for recovering the chrominance signal according to an example embodiment of the present invention. Referring to FIG. 7, the decoding apparatus 700 includes a chrominance signal separating filter 701, a down-mixing unit 710, a cloche filtering unit 720, a chrominance signal recovering unit 730, a first sign recovering unit 760a, a second sign recovering unit 760b, and a sign applying unit 770.

The chrominance signal separating filter 701 separates the chrominance signal from the received SECAM composite video baseband signal CVBS. The chrominance noise is reduced by separating the chrominance signal from the luminance signal early in the process. As described above, the SECAM composite video baseband signal CVBS inputted to the chrominance signal separating filter 701 may include a $D_R$ line's composite video baseband signal alternating with a $D_B$ line's composite video baseband signal.

The frequency response characteristic of the chrominance signal separating filter 701 and its operation have been described previously with reference to FIG. 4.

The down-mixing unit 710 multiplies sine and cosine waves having a frequency and phase equal to those of a carrier by the chrominance signal outputted from the chrominance signal separating filter 710. The down-mixing unit 710 filters the high frequency components from the chrominance signal. The down-mixing unit 710 thus removes the carrier frequency ($f_0$) component of the chrominance signal and shifts the chrominance signal from the high to the low frequency band.

Referring to FIG. 7, the down-mixer 710 may include a first down-mixer 711 and a second down-mixer 712. Also, the first down-mixer 711 may include a multiplier for multiplying a cosine wave (e.g., $\cos 2\pi f_0 t$) having a frequency and phase equal to those of a carrier by the chrominance signal outputted from the chrominance signal separating filter 701. And the first down-mixer 711 may include a low pass filter for filtering the output of the multiplier. The multiplier and the low pass filter are not shown in FIG. 7.

The second down-mixer 712 may include a multiplier for multiplying a sine wave (e.g., $\sin 2\pi f_0 t$) having a frequency and phase equal to those of a carrier by the chrominance signal by the chrominance signal outputted from the chrominance signal separating filter 701. And the second down-mixer 712 may include a low pass filter for filtering the output of the multiplier. The multiplier and the low pass filter are not shown in FIG. 7.

The cos $2\pi f_0 t$ and sin $2\pi f_0 t$ components that are respectively inputted to the first and second down-mixers 711 and 712 may be provided internally or externally to the apparatus 700. In the example embodiment illustrated in FIG. 7, the cos $2\pi f_0 t$ and sin $2\pi f_0 t$ components are provided external to the decoding apparatus 700.

Referring to FIG. 7, the cloche filtering unit 720 includes a first cloche filter 721 and a second cloche filter 722. The first cloche filter 721 decodes the output of the first down-mixer 711. The second cloche filter 721 decodes the output of the second down-mixer 712.

The chrominance signal recovering unit 730 converts the original chrominance signal from the frequency component of the sinusoidal wave into the amplitude component by using two signals, which have passed through the down-mixing unit 710 and the cloche filtering unit 720 and have a 90° phase difference relative to each other.

Referring to FIG. 7, the chrominance signal recovering unit 730 may include a first differentiator 731, a first squarer 732, a second differentiator 741, a second squarer 742, an adder 750, and a square root 751.

The first differentiator 731 differentiates the output of the first cloche filter 721 and the first squarer 732 squares the output of the first differentiator 731. Similarly, the second differentiator 741 differentiates the output of the second cloche filter 722 and the second squarer 742 squares the output of the second differentiator 732. The adder 750 sums the outputs of the first and second squarers 732 and 742.

The square root 751 calculates the square root of the value outputted from the adder 750 to produce the chrominance signal existing as the phase component of the sinusoidal wave. The chrominance signal output from the adder 750 is the product of constants and chrominance signals.

An error-free square root system may be used as the square root 751. The error-free square root system is a hardware square rooter that does not use a look-up table or a seed table, and can reduce errors with respect to the value functionally calculated.

The first sign recovering unit 760a, the second sign recovering unit 760b, and the sign applying unit 770 are used to determine the sign of the signal outputted from the square rooter 751.

Referring to FIG. 7, the first sign recovering unit 760a includes sign checkers 761a and 762a and a sign determination blocks 763a. Similarly, the second sign recovering unit 760b includes sign checkers 761b and 762b and a sign determination block 763b.

The operations of the sign checkers 761a, 762a, 761b and 762b and the sign determination blocks 763a and 763b are similar to those of the sign checkers 310, 311, 312 and 313 and the sign determination blocks 314 and 315 described with reference to FIG. 3.

The sign applying unit 770 receives the outputs of the sign determination blocks 763a and 763b of the first and second sign recovering units 760a and 760b and assigns the sign to the signal that is finally outputted from the square root 751. The operation of the sign applying unit 770 is similar to that of the sign applier 320 described with reference to FIG. 3.

Figure 8:
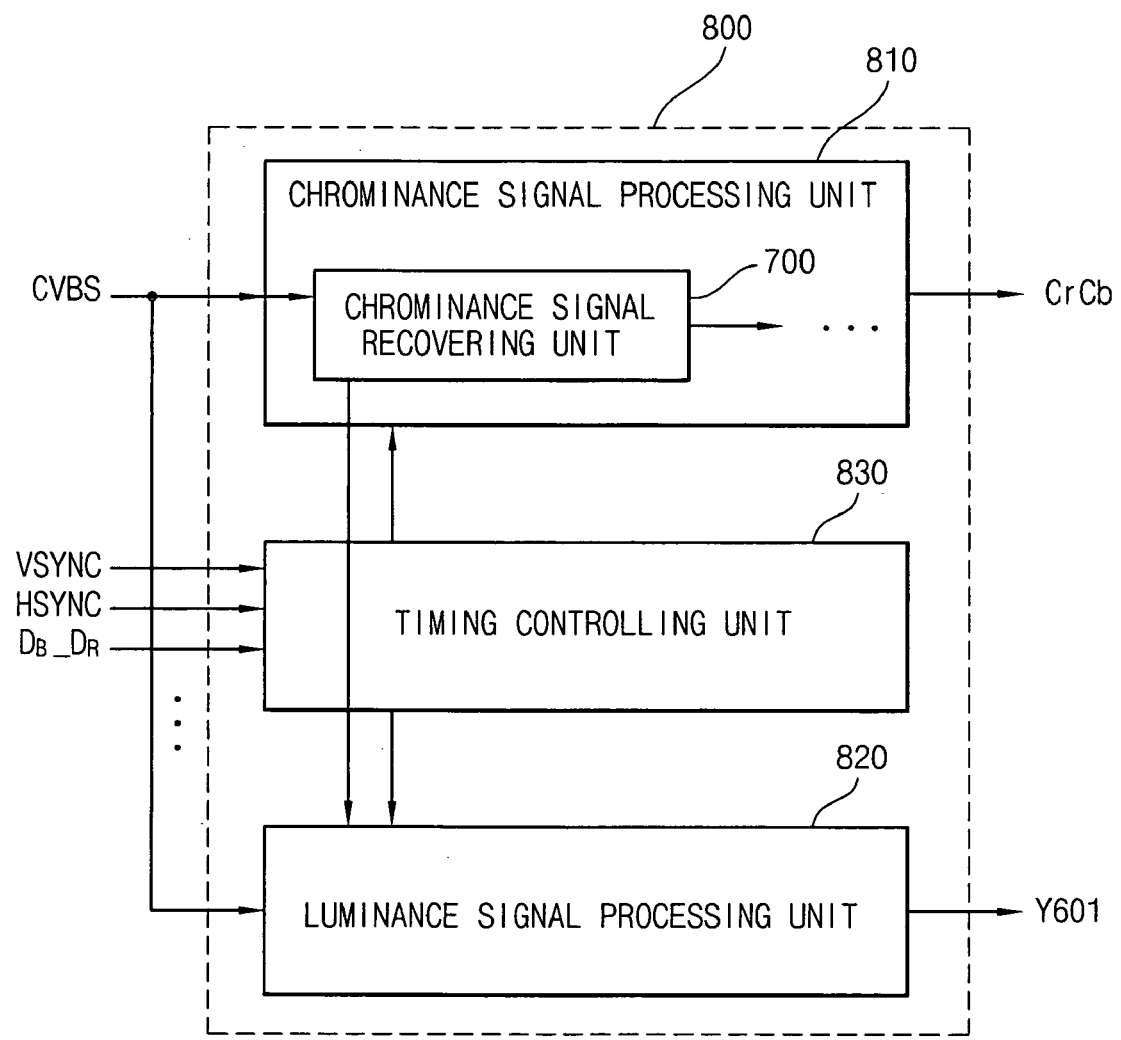
FIG. 8 is a block diagram of a SECAM video decoder for decoding the SECAM chrominance signal according to an example embodiment.

FIG. 8 is a block diagram of a SECAM video decoder having an apparatus for decoding the SECAM chrominance signal according to an example embodiment of the present invention. Referring to FIG. 8, the SECAM video decoder 800 includes a chrominance signal processing unit 810, a luminance signal processing unit 820, and a timing controlling unit 830.

The chrominance signal processing unit 810 includes the apparatus 700 for decoding the SECAM chrominance signal. The chrominance signal processing unit 810 decodes the SECAM chrominance video baseband signal CVBS into the original chrominance signal, and outputs the original chrominance signal in a CrCb format.

Although not illustrated in FIG. 8, the chrominance signal processing unit 810 may further include a de-emphasis filter, a converting unit for converting the $D_B$ and $D_R$ chrominance signals outputted from the decoding apparatus 700 into the CrCb format, and other various elements known to a person of reasonable skill in the art. The luminance signal processing unit 820 recovers the luminance signal of the SECAM composite video baseband signal CVBS and outputs the recovered luminance signal in an Y601 format.

Similar to the chrominance signal processing unit 810, the luminance signal processing unit 820 may directly receive the SECAM composite video baseband signal CVBS and remove the frequency component by using a multiple notch filter. Alternatively, the chrominance signal processing unit 810 may separate the luminance signal based on the difference between the chrominance signal separated by the chrominance signal processing unit 810 and the SECAM composite video baseband signal CVBS. In FIG. 8, the chrominance signal processing unit 810 receives the difference between the chrominance signal separated by the chrominance signal processing unit 810 and the SECAM composite video baseband signal CVBS to separate the luminance signal.

The timing controlling unit 830 receives a vertical synchronization signal VSYNC, a horizontal synchronization signal HSYNC, and a signal $D_B\_D_R$. The signal $D_B\_D_R$ is used to determine whether a currently inputted chrominance signal is the $D_B$ line's chrominance signal or the $D_R$ line's chrominance signal. Using the synchronization signals VSYNC and HSYNC, the timing controlling unit 830 controls the chrominance signal processing unit 810 and the luminance signal processing unit 820, and controls the operation of recovering the luminance signal and the chrominance signal from the SECAM composite video baseband signal CVBS.

According to the example embodiments of the present invention, the chrominance noise may be reduced by using the band-pass filter to separate the chrominance signal component from the SECAM composite video baseband signal. In addition, by applying the sign compensating method using differentiation, the frequency-modulated chrominance signal may be decoded with a simpler hardware configuration. This hardware configuration may include the differentiator, the squarer, and the square root. Specifically, the differential error in the hardware differentiation may be compensated using the sign compensating method. Therefore, the chrominance signal recovered using a simpler hardware configuration is stable.

While the present invention has been described with respect to the particular embodiments, it will be apparent to those skilled in the art that various changes and modifications may be made without departing from the spirit and scope of the invention as defined in the following claims.

We claim the following:

1. A method for decoding a SECAM composite video baseband signal, comprising:
   band-pass filtering the SECAM composite video baseband signal to separate a chrominance signal component;
   down-mixing the chrominance signal component from a high frequency band into a low frequency band to generate at least two down-mixed signals having a substantially phase difference relative to each other;
   cloche-filtering the at least two down-mixed signals to generate at least two cloche-filtered signals;
   differentiating each of the at least two cloche-filtered signals to generate at least two differentiated signals;
   squaring each of the at least two differentiated signals to generate at least two squared signals;
   summing the at least two squared signals to generate a summed signal; and
   taking a square-root of the summed signal to generate a decoded signal.

2. The method of claim 1 comprising determining a sign of the decoded signal.

3. The method of claim 2
   where the at least two cloche-filtered signals include a first cloche-filtered signal and a second cloche-filtered signal; and
   where the determining the sign includes:
     determining a first sign by multiplying a sign of the first cloche-filtered signal by a sign of a signal generated differentiating the second cloche-filtered signal;
     determining a second sign by multiplying a sign of the second cloche-filtered signal by a sign of a signal generated by differentiating the first cloche-filtered signal;
     providing a sign of a prior sample as the sign of the decoded signal if the first sign is different from the second sign and providing the first sign otherwise.

4. The method of claim 1 where the down-mixing the chrominance signal component includes:
   removing a carrier component from the separated chrominance signal component; and
   low-pass filtering a signal resulting from the removing.

5. The method of claim 1
   where the chrominance signal component includes a $D_R$ line's chrominance signal and a $D_B$ line's chrominance signal;
   where the $D_R$ line's chrominance signal is given by $G \cdot \sin 2\pi \{f_{OR} \cdot t + \Delta f_{OR} \int_0 D_R(\tau) d\tau\};$ where the $D_B$ line's chrominance signal is given by $G \cdot \sin 2\pi \{f_{OB} \cdot t + \Delta f_{OB} \int_0 D_B(\tau) d\tau\};$ and where $f_{OR}$ denotes a sub-carrier frequency of the $D_R$ chrominance signal,
     $f_{OB}$ denotes a sub-carrier frequency of the $D_B$ chrominance signal,
     $D_R(\tau)$ denotes an original $D_R$ chrominance signal,
     $D_B(\tau)$ denotes an original $D_B$ chrominance signal,
     $\Delta f_{OR}$ denotes a frequency deviation of the $D_R$ chrominance signal,
     $\Delta f_{OB}$ denotes a frequency deviation of the $D_B$ chrominance signal, and
     G denotes an amplitude of the chrominance signal component.

6. The method of claim 1
   where, when the chrominance signal component is a $D_R$ line's chrominance signal, the at least two down-mixed signals are given by $$\frac{1}{2} G \sin 2\pi \left\{(f_{OR} - f_0) t + \Delta f_{OR} \int_0^t D_R(\tau) d\tau\right\}$$

and $$\frac{1}{2} G \cos 2\pi \left\{(f_{OR} - f_0) t + \Delta f_{OR} \int_0^t D_R(\tau) d\tau\right\}; \text{ and}$$

where, when the chrominance signal component is a $D_B$ line's chrominance signal, the at least two down-mixed signals are given by $$\frac{1}{2} G \sin 2\pi \left\{(f_{OB} - f_0) t + \Delta f_{OB} \int_0^t D_B(\tau) d\tau\right\}$$

and $$\frac{1}{2} G \cos 2\pi \left\{(f_{OB} - f_0) t + \Delta f_{OB} \int_0^t D_B(\tau) d\tau\right\};$$

where $f_{OR}$ denotes a sub-carrier frequency of the $D_R$ chrominance signal,
     $f_{OB}$ denotes a sub-carrier frequency of the $D_B$ chrominance signal,
     $D_R(\tau)$ denotes an original $D_R$ chrominance signal,
     $D_B(\tau)$ denotes an original $D_B$ chrominance signal,
     $\Delta f_{OR}$ denotes a frequency deviation of the $D_R$ chrominance signal,
     $\Delta f_{OB}$ denotes a frequency deviation of the $D_B$ chrominance signal, and
     G denotes an amplitude of the chrominance signal component.

7. The method of claim 6
   where, when the at least two cloche-filtered signals are signals separated from the $D_R$ line's chrominance signal, the at least two differentiated signals are given by $\pi G\{(f_{OR}-f_0)+\Delta f_{OR}D_R(\tau)\} \times \cos 2\pi\{(f_{OR}-f_0)t+\Delta f_{OR}\int_0 D_R(\tau) d\tau\}$ and $-\pi G\{(f_{OR}-f_0)+\Delta f_{OR}D_R(\tau)\} \times \sin 2\pi\{(f_{OR}-f_0)t+\Delta f_{OR}\int_0 D_R(\tau) d\tau\};$ and where, when the at least two cloche-filtered signals are signals separated from the $D_B$ line's chrominance signal, the at least two differentiated signals are given by $\pi G\{(f_{OB}-f_0)+\Delta f_{OB}D_B(\tau)\} \times \cos 2\pi\{(f_{OB}-f_0)t+\Delta f_{OB}\int_0 D_B(\tau) d\tau\}$ and $-\pi G\{(f_{OB}-f_0)+\Delta f_{OB}D_B(\tau)\} \times \sin 2\pi\{(f_{OB}-f_0)t+\Delta f_{OB}\int_0 D_B(\tau) d\tau\}.$ 8. The method of claim 7
   where, when the chrominance signal component includes the $D_R$ line's chrominance signal, the decoded signal is given by $\pi G\{(f_{OR}-f_0)+\Delta f_{OR}D_R(\tau)\};$ and where, when the chrominance signal component includes the $D_B$ line's chrominance signal, the decoded signal is given by $\pi G\{(f_{OB}-f_0)+\Delta f_{OB}D_B(\tau)\}.$ 9. The method of claim 8
where, when the chrominance signal component includes the $D_R$ line's chrominance signal, the determining the sign includes
determining the first sign given by $$\text{sign}\left(\pi G\{(f_{OR}-f_0)+\Delta f_{OR}D_R(\tau)\}\times\right.$$
$$\cos 2\pi\left\{(f_{OR}-f_0)t+\Delta f_{OR}\int_0^t D_R(\tau)d\tau\right\}\times$$
$$\left.\text{sign}\left(\frac{1}{2}G\cos 2\pi\left\{(f_{OR}-f_0)t+\Delta f_{OR}\int_0^t D_R(\tau)d\tau\right\}\right)\right)$$

determining the second sign given by $$-\text{sign}\left(-\pi G\{(f_{OR}-f_0)+\Delta f_{OR}D_R(\tau)\}\times\right.$$
$$\sin 2\pi\left\{(f_{OR}-f_0)t+\Delta f_{OR}\int_0^t D_R(\tau)d\tau\right\}\times$$
$$\left.\text{sign}\left(\frac{1}{2}G\sin 2\pi\left\{(f_{OR}-f_0)t+\Delta f_{OR}\int_0^t D_R(\tau)d\tau\right\}\right)\right); \text{and}$$

where the sign of the decoded signal is a sign of a prior sample if the first sign is different from the second sign and where the sign of the decoded signal is the first sign otherwise.

10. The method of claim 8 where, when the chrominance signal component includes the $D_R$ line's chrominance signal, the determining the sign includes
determining the first sign given by $$\text{sign}\left(\pi G\{(f_{OB}-f_0)+\Delta f_{OB}D_B(\tau)\}\times\right.$$
$$\cos 2\pi\left\{(f_{OB}-f_0)t+\Delta f_{OB}\int_0^t D_B(\tau)d\tau\right\}\times$$
$$\left.\text{sign}\left(\frac{1}{2}G\cos 2\pi\left\{(f_{OB}-f_0)t+\Delta f_{OB}\int_0^t D_B(\tau)d\tau\right\}\right)\right)$$

determining the second sign given by $$-\text{sign}\left(-\pi G\{(f_{OB}-f_0)+\Delta f_{OB}D_B(\tau)\}\times\right.$$
$$\sin 2\pi\left\{(f_{OB}-f_0)t+\Delta f_{OB}\int_0^t D_B(\tau)d\tau\right\}\times$$
$$\left.\text{sign}\left(\frac{1}{2}G\sin 2\pi\left\{(f_{OB}-f_0)t+\Delta f_{OB}\int_0^t D_B(\tau)d\tau\right\}\right)\right); \text{and}$$

where the sign of the decoded signal is a sign of a prior sample if the first sign is different from the second sign and where the sign of the decoded signal is the first sign otherwise.

11. An apparatus, comprising:
a chrominance signal separating filter to separate a chrominance signal component from a SECAM composite video baseband signal;
a down-mixing unit having a first down-mixer and a second down-mixer to generate at least two down-mixed signals having a substantially 90° phase difference between them by down-mixing the chrominance signal component from a high frequency band into a predetermined frequency band;
a cloche filtering unit to generate at least two cloche-filtered signals having a first cloche-filtered signal and a second cloche-filtered signal by cloche-filtering the at least two down-mixed signals; and
a chrominance signal recovering unit to recover an original chrominance signal by manipulating the at least two cloche-filtered signals, the chrominance signal recovering unit including a first differentiator to generate a first differentiated signal by differentiating the first cloche-filtered signal and a second differentiator to generate a second differentiated signal by differentiating the second cloche-filtered signal.

12. The apparatus of claim 11 where the chrominance signal separating filter is a band-pass filter having a pass band substantially equal to a frequency band of the chrominance signal.

13. The apparatus of claim 11
where the first down-mixer generates a first down-mixed signal by multiplying the chrominance signal component by a cosine wave having a frequency and phase equal to a frequency and phase of a carrier and low-pass filtering the multiplied signal;
and where the second down-mixer generates a second down-mixed signal by multiplying the chrominance signal component by a sine wave having a frequency and phase equal to a carrier and low-pass filtering the multiplied signal.

14. The apparatus of claim 13 where the chrominance signal recovering unit further includes:
a first squarer to generate a first squared signal by squaring the first differentiated signal;
a second squarer to generate a second squared signal by squaring the second differentiated signal;
an adder to generate a sum by adding the first and second squared signals; and
a square rooter to generate the original chrominance signal by calculating a square root of the sum.

15. The apparatus of claim 14 where the square rooter is an error-free square root system.

16. The apparatus of claim 14 comprising,
a sign recovering unit to determine a sign of the original chrominance signal.

17. The apparatus of claim 16 where the sign recovering unit includes:
a first sign recovering unit to determine a first sign responsive to a sign of one of the at least two cloche-filtered signals and a sign of the first differentiated signal;
a second sign recovering unit to determine a second sign responsive to a sign of another of the at least two cloche-filtered signals and a sign of the second differentiated signal; and
a sign applying unit to determine the sign of the original chrominance signal as the first sign if the first and second signs are substantially equal and to apply a sign of a prior sample otherwise.

18. The apparatus of claim 17 where the first sign recovering unit includes:
a first sign checker to check the sign of a second cloche-filtered signal;
a second sign checker to check the sign of the first differentiated signal; and
a sign determination block to generate the first sign by multiplying a sign output from the first sign checker with a sign output from the second sign checker.

19. The apparatus of claim 17 where the second sign recovering unit includes:
   a first sign checker to check the sign of a first cloche-filtered signal;
   a second sign checker to check the sign of the second differentiated signal; and
   a sign determination block to generate the second sign by multiplying a sign output from the first sign checker with a sign output from the second sign checker.

20. A SECAM video decoder comprising:
   a chrominance signal processing unit to recover a chrominance signal component in a SECAM composite video baseband signal;
   a luminance signal processing unit to recover a luminance signal component in the SECAM composite video baseband signal; and
   a timing controlling unit to control the chrominance signal processing unit and the luminance signal processing unit responsive to synchronization signals;
   where the chrominance signal processing unit includes:
      a chrominance signal separating filter to separate a chrominance signal component from a SECAM composite video baseband signal;
      a down-mixing unit to generate at least two down-mixed signals having a substantially 90° phase difference between them by down-mixing the chrominance signal component from a high frequency band into a frequency band;
      a cloche filtering unit to generate at least two cloche-filtered signals by cloche-filtering the at least two down-mixed signals;
      a chrominance signal recovering unit to recover an original chrominance signal by manipulating the at least two cloche-filtered signals; and
      a sign recovering unit to determine a sign of the original chrominance signal.

* * * * *